US006550806B1

(12) United States Patent
Gillis et al.

(10) Patent No.: US 6,550,806 B1
(45) Date of Patent: Apr. 22, 2003

(54) APPARATUS AND METHOD FOR DETERMINING DISTANCE UTILIZING A CONTINUOUSLY VARIABLE RATE SENSOR FOR VEHICLE OCCUPANT POSITION SENSING

(75) Inventors: Edward J. Gillis, South Lyon, MI (US); Stephen R. W. Cooper, Fowlerville, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/552,328

(22) Filed: Apr. 19, 2000

(51) Int. Cl.$^7$ .............................................. B60R 21/32
(52) U.S. Cl. ..................... 280/735; 180/282; 701/45
(58) Field of Search ............................. 280/735, 731, 280/730.2, 736, 739; 180/282, 272, 273; 701/45; 340/436, 438

(56) References Cited

U.S. PATENT DOCUMENTS

| 5,490,069 | A | * | 2/1996 | Gioutsos et al. ............ 280/735 |
| 5,904,368 | A | | 5/1999 | Blackburn et al. |
| 5,906,393 | A | | 5/1999 | Mazur et al. |
| 5,991,234 | A | * | 11/1999 | Sejalon et al. ................ 367/13 |
| 6,018,693 | A | | 1/2000 | Blackburn et al. |
| 6,116,640 | A | * | 9/2000 | Tanaka et al. .............. 280/735 |
| 6,158,768 | A | * | 12/2000 | Steffens, Jr. et al. ........ 280/735 |
| 6,168,198 | B1 | * | 1/2001 | Breed et al. ................ 280/735 |
| 6,186,538 | B1 | * | 2/2001 | Hamada et al. ............. 280/735 |
| 6,186,539 | B1 | * | 2/2001 | Foo et al. ................... 280/735 |
| 6,188,940 | B1 | * | 2/2001 | Blackburn et al. .......... 280/735 |
| 6,196,579 | B1 | * | 3/2001 | Bowers et al. .............. 280/735 |
| 6,220,628 | B1 | * | 4/2001 | Konja ......................... 280/735 |
| 6,236,035 | B1 | * | 5/2001 | Saar et al. .................. 280/735 |
| 6,270,116 | B1 | * | 8/2001 | Breed et al. ................ 280/735 |
| 6,283,503 | B1 | * | 9/2001 | Breed et al. ................ 280/735 |
| RE37,736 | E | * | 6/2002 | Breed et al. ................ 280/735 |
| 6,422,595 | B1 | * | 7/2002 | Breed et al. ................ 280/735 |

FOREIGN PATENT DOCUMENTS

WO    WO-94/22693    * 10/1994  .............. 280/735

* cited by examiner

*Primary Examiner*—Brian L. Johnson
*Assistant Examiner*—Hau Phan
(74) *Attorney, Agent, or Firm*—Tarolli, Sundheim, Covell & Tummino L.L.P.

(57) ABSTRACT

An apparatus (42) determines distance to an object (12), and preferably the object is a vehicle occupant. A sensor (40) of the apparatus (42) senses distance to the occupant (12) at a sensor rate. A rate determination function portion (74) of a controller (30) varies the sensor rate as a function of the sensed distance. Preferably, the sensor (40) emits signals (46) at the sensor rate toward the occupant (12) and receives reflected signals from the occupant. A time between emission of a signal and reception of an associated reflected signal is used to determine a distance to the occupant (12) at a distance determination function portion (54) of the controller (30). Change in the rate of signal emission is in response to each change in determined distance and is continuous with the change in determined distance. Preferably, the apparatus is part of an occupant protection system (10) for a vehicle (16). A portion (60) of the controller (30) makes determinations regarding control of a protection device (18) of the system (10) using the sensed distance.

19 Claims, 4 Drawing Sheets

APPARATUS AND METHOD FOR DETERMINING DISTANCE UTILIZING A CONTINUOUSLY VARIABLE RATE SENSOR FOR VEHICLE OCCUPANT POSITION SENSING

TECHNICAL FIELD

The present invention is directed to distance determination via a sensor, such as vehicle occupant position sensing within an actuatable occupant protection system, and is particularly directed to control of a rate of the sensor.

BACKGROUND OF THE INVENTION

Occupant protection systems for use in vehicles are known in the art. One type of protection system includes an actuatable inflatable restraint module, which has an inflatable restraint that is commonly referred to as an air bag. The module is actuated and the air bag is inflated within a vehicle passenger compartment upon the occurrence of a condition for which a vehicle occupant is to be protected. For example, a sensor senses a vehicle condition indicative of a vehicle crash and, in response thereto, the air bag module is actuated.

Occupant protection systems commonly have one or more adjustable aspects, and in order to enhance performance of the protection system, the adjustable aspect(s) are adjusted. In the air bag art, an air bag module that has an adjustable aspect is commonly referred to as a "smart restraint." Examples of adjustable aspects for air bag modules include the deployment dynamic profile of the air bag. Specifically, the inflation timing, the inflation pressure, the rate of inflation, and the positioning of the inflated air bag are all adjustable aspects. Also, suppression of air bag deployment entirely is an adjustable aspect. Adjustment of the air bag module is often responsive to a sensed occupant condition.

In certain circumstances, even if the predetermined deployment vehicle crash condition occurs, it may be preferable to refrain from actuating the air bag module (i.e., deployment is suppressed and the air bag is not inflated). Specifically, if the occupant associated with the air bag module is located in a position such that air bag module actuation will not enhance protection of the occupant, actuation does not occur.

An occupant who is very near an air bag module is referred to as being within an occupant out-of-position (OOP) zone. Deploying an air bag for an occupant who is within the OOP zone will not enhance protection of the occupant. Similarly, when an occupant is near, but not within, the OOP zone, it may be preferable to provide a reduced inflation pressure to the air bag. Often, an occupant is displaced from an initial location that is away from the occupant OOP zone to a location within or near the occupant OOP zone as a result of pre-crash braking or deceleration of the vehicle that occurs just prior to the occurrence of a vehicle crash.

Pertinent occupant condition(s) are sensed and the information regarding the sensed condition(s) is processed in order to control adjustment. Protection systems, such as air bag systems, have sensor(s) for sensing the occupant condition(s). Within air bag systems, ranging sensors are typically used to provide distance information that is utilized to determine if an occupant is within or near an occupant OOP zone.

As an example of a ranging sensor, an ultrasound sensor emits a signal pulse or "ping" that is directed at a vehicle occupant location, the pulse is reflected back to the sensor as an echo and is detected. A time duration between emission and reception is commonly referred to as a time-of-flight and is indicative of a distance between the sensor and the occupant. At typical air temperatures, an ultrasonic signal travels at approximately 13.5 inches per millisecond. Thus, one millisecond expires for each 6.75 inches that the occupant is located away from the ultrasound sensor. In one type of vehicle application the ultrasonic signals (pings) are output at 10 millisecond intervals (i.e., at a rate of one ping per 10 milliseconds). This rate allows the sensor to "bounce" signals off of an occupant or another object (e.g., a seat back) up to a distance of approximately 67.5 inches from the sensor.

In some circumstances, it may be desirable to determine occupant position (e.g., distance to occupant) more frequently. Such a situation may occur for an occupant who is being displaced forward due to pre-crash vehicle braking or deceleration.

SUMMARY OF THE INVENTION

In accordance with one aspect, the present invention provides an apparatus for determining distance to an object. Sensor means of the apparatus senses distance to the object at a sensor rate. Variation means of the apparatus varies the sensor rate as a function of the sensed distance.

In accordance with another aspect, the present invention provides an apparatus that includes means for emitting signals at a rate toward an object. The object reflects the signals. Means receives reflected signals from the object. Means determines a time between emission of a signal and reception of an associated reflected signal. Means determines a distance to the object using the determined time. Means changes the rate of signal emission in response to each change in determined distance.

In accordance with another aspect, the present invention provides an apparatus that includes means for emitting signals at a rate toward an object. The object reflects the signals. Means receives reflected signals from the object. Means determines a time between emission of a signal and reception of an associated reflected signal. Means determines a distance to the object using the determined time. Means continuously changes the rate of signal emission from the means for emitting in response to the determined distance.

In accordance with yet another aspect, the present invention provides an occupant protection system for a vehicle. The system includes an actuatable occupant protection device. Sensor means senses distance to a vehicle occupant at a sensor rate. Determination means makes determinations regarding control of the protection device using the sensed distance. Variation means varies the sensor rate inversely proportional to the sensed distance.

In accordance with yet another aspect, the present invention provides a method for determining distance to an object. Distance to the object is sensed at a sensor rate. The sensor rate is varied as a function of the sensed distance.

In accordance with yet another aspect, the present invention provides a method for controlling an occupant protection device in an occupant protection system for a vehicle. A distance to a vehicle occupant is sensed at a sensor rate. Determinations regarding control of the protection device are made using the sensed distance. The sensor rate is varied inversely proportional to the sensed distance.

BRIEF DESCRIPTION OF THE DRAWINGS

Further features and advantages of the present invention will become apparent to those skilled in the art to which the present invention relates from reading the following description with reference to the accompanying drawings, in which.

DESCRIPTION OF PREFERRED EMBODIMENT

Figure 1:
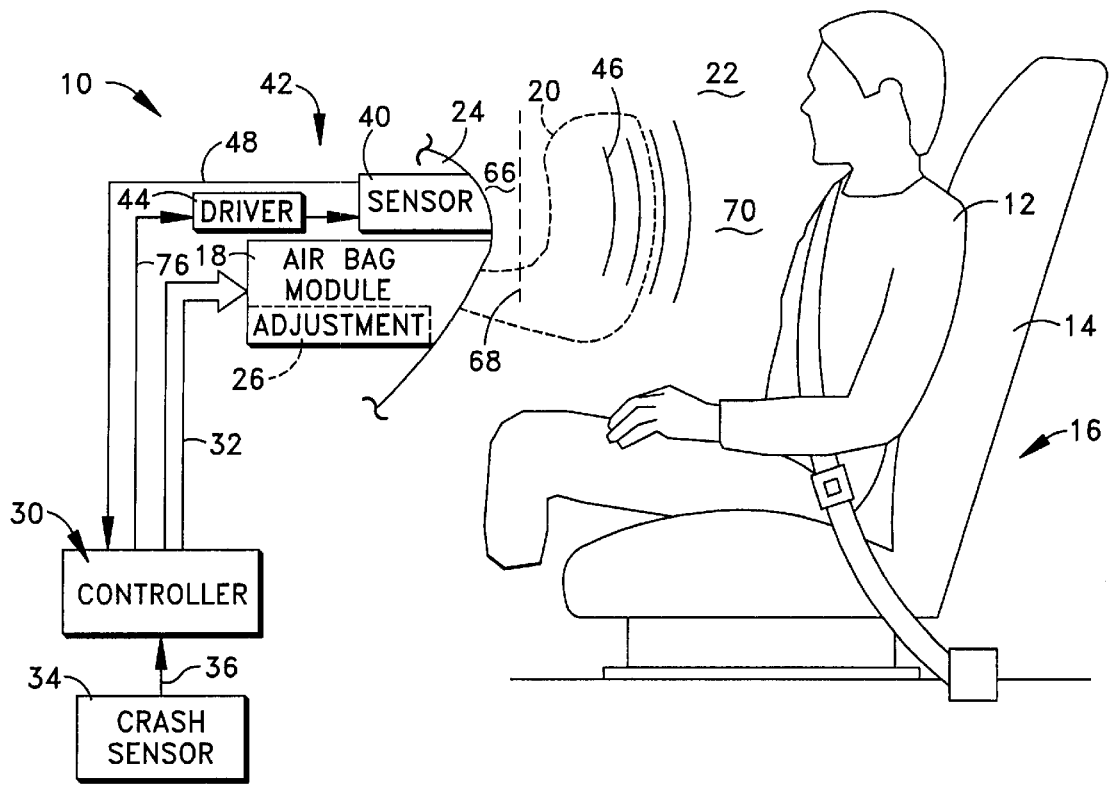
FIG. 1 is a schematic illustration of a vehicle occupant protection system that incorporates an apparatus in accordance with the present invention.

An occupant protection system 10 is schematically illustrated in FIG. 1. The system 10 is provided for an occupant 12 seated on a vehicle seat 14 within a vehicle 16. The system 10 includes an actuatable occupant protection device 18. In one preferred embodiment, the protection device 18 is an inflatable restraint module that includes an inflatable restraint 20, commonly referred to as an air bag. The air bag 20 is inflatable within an occupant compartment 22 of the vehicle 16. Hereinafter, the protection device 18 is referred to as the air bag module 18.

In the illustrated example, the air bag module 18 is located within a dashboard or instrument panel 24 of the vehicle 16 and is associated with the seat 14, which is a front passenger seat. It will be appreciated by a person of ordinary skill in the art that the air bag module 18 may be another type of inflatable air bag module (e.g., a driver side air bag module) and may be located elsewhere with the vehicle (e.g., on the steering wheel). Also, it will be appreciated that the system 10 may include a plurality of actuatable air bag modules and that the system may include an actuatable protection device other than an inflatable air bag module, such as an actuatable knee bolster or a seat belt system with an actuatable portion (e.g., a pretensioner).

In the illustrated example, the air bag module 18 has at least one adjustable aspect 26. For example, the deployment of the air bag is adjustable. Also, suppression of air bag deployment entirely is an adjustable aspect.

Examples of an air bag deployment adjustment include adjustment of inflation timing, adjustment of inflation pressure, adjustment of location of the inflated air bag relative to the occupant 12, and adjustment of the dynamic profile of the air bag during inflation. A specific example of adjustment to inflation timing is selection of a time period between a determination to actuate the air bag module 18 and an initiation of air bag inflation. A specific example of adjustment of inflation pressure is control of a pressure relief valve that vents the air bag 20. A specific example of adjustment of air bag positioning is control of positioning motors operative to move an air bag module housing. Another specific example of adjustment of air bag positioning is moving the entire air bag module toward or away from the occupant and/or moving the occupant toward or away from the air bag module. Dynamic profile control is accomplished by directing inflation fluid into the air bag 20 in predetermined zones within the air bag or by control of the number and timing of a plurality of inflation sources and vent valves.

Control of the air bag module 18, to adjust the adjustable aspect(s) 26 and to cause actuation of the air bag module, is accomplished by a controller 30 which provides control signals 32 to the air bag module. In one example, the controller 30 is a microcomputer. The controller 30 receives sensory input from several sources and, using the sensory input, makes determinations regarding air bag device control.

One of the sensory input sources for the controller 30 is a sensor 34 that senses a vehicle condition for which the occupant 12 is to be protected and provides a signal 36 to the controller 30 indicative of the sensed vehicle condition. In one example, which is illustrated in the Figures, the sensor 34 is a crash sensor and senses a condition that is indicative of a vehicle crash (e.g., a vehicle collision or a vehicle rollover). Preferably, the crash sensor 34 is an accelerometer, and the signal 36 is an electrical signal having a voltage value indicative of the sensed acceleration and/or a frequency value indicative of the sensed acceleration. It should be appreciated by a person of ordinary skill in the art that the system 10 could have a plurality of sensors providing signals to the controller 30 that are indicative of vehicle conditions for which the occupant 12 is to be protected. For simplicity, only the single crash sensor 34 and its crash indicative signal 36 are discussed.

Another sensory input source for the controller 30 is a sensor 40 for sensing position of the occupant 12 with regard to the air bag module 18. A distance between the air bag module 18 and the occupant 12 indicates occupant position. The sensor 40 is a ranging sensor (i.e., a distance sensing sensor) that together with portions of the controller 30 comprise a distance determining apparatus 42 in accordance with the present invention. Preferably, the sensor 40 is an ultrasound sensor that is operatively mounted in the instrument panel 24 so as to measure distance between the sensor and the occupant 12. The distance between the sensor 40 and the occupant 12 is related to the distance between the air bag module 18, which is also located within the instrument panel 24, and the occupant 12.

A person of ordinary skill in the art will appreciate that the ultrasound sensor 40 may be located at any other suitable location within the vehicle 16 for occupant position sensing. For example, the ultrasound sensor 40 may be located in visor or headliner area of the vehicle 16. For such an example, a relationship of a distance between the occupant 12 and the air bag module 18 would again be dependent upon a known relationship of a distance between the sensor and the air bag module.

In order to sense distance to the occupant 12, the ultrasound sensor 40 is energized via a driver 44 of the distance determining apparatus 42 to emit an ultrasonic energy signal 46 (e.g., a "ping") toward the occupant 12. The energy signal 46 is preferably a short burst of energy at a predetermined carrier frequency. Ultrasonic energy is reflected (e.g., bounced) from the occupant 12 back toward the ultrasound sensor 40. The ultrasound sensor 40 receives the reflected ultrasonic energy (i.e., an echo), and outputs a signal 48 to the controller 30.

Information regarding distance is contained in the signal 48. For example, the signal 48 may indicate ultrasonic signal emission and echo receipt, per se, for use as time points or may indicate elapsed time between emission and receipt. Elapsed time (i.e., time of flight of the ultrasonic signal 46 out and back) is proportional to the distance between the ultrasound sensor 40 and the object (i.e., the occupant 12) from which the echo was reflected. At the controller 30 the information contained with the signal 48 is processed to make a determination regarding distance (e.g., calculate the distance using expected rate of travel of ultrasonic energy through air).

The ultrasound sensor 40 repeatedly cycles through transmission of the ultrasonic energy signal 46 at a rate that is referred to as a sensor rate. The sensor rate is effectuated via the driver 44. In other words, the driver 44 controls the tempo of the ultrasonic "pings". As an example during operation of the apparatus 42, the sensor rate may have an associated period on the order of milliseconds (e.g., one signal output every 10 milliseconds and thus one distance measurement occurs every 10 milliseconds).

Based upon the input signals 36 and 48, the controller 30 provides the control signals 32 to the air bag module 18. Specifically, the controller 30 includes a crash determination function 52 (FIG. 2) that processes the information contained within the signal 36 from the crash sensor 34, and has a distance determination function 54 that processes the information contained within the signal 48. The crash determination function 52 and the distance determination function 54 output respective signals 56 and 58 to an air bag control determination function 60.

Determinations regarding control of the air bag module 18 (i.e., adjustment and actuation control) are made based upon the indication of crash occurrence (i.e., a collision determination using signal 36) and occupant position (i.e., a distance determination using signal 48). For example, the air bag control determination function 60 utilizes the information in an algorithm for determining whether to actuate the air bag module 18. In a preferred embodiment (shown in the Figures), one determination that is made within the air bag control determination function 60 is whether the occupant 12 is currently located within an occupant out-of-position (OOP) zone 66 (FIG. 1).

The OOP zone 66 is a region or location within the occupant compartment 22 adjacent to the instrument panel 24 and bounded by an OOP boundary 68 (i.e., that region between the instrument panel and the OOP boundary). The OOP boundary 68 is located at a distance spaced from the instrument panel 24 (i.e., the instrument panel, with the affixed ultrasound sensor 40, is the reference location from which the distance to the OOP boundary is measured). The OOP boundary 68 separates the OOP zone 66 from an occupant in-position zone 70. Actuating the air bag module 18 to inflate the air bag 20 would not enhance the protection of an occupant who is located within the OOP zone 66. Specifically, actuating the air bag module 18 would not enhance protection if the torso/head/thorax of such an occupant were located with the OOP zone 66.

Focusing now on the occupant 12, the position of the occupant 12, relative to the air bag module 18, can change during a pre-crash braking or other large vehicle deceleration. Specifically, during the vehicle deceleration, inertia of the occupant 12 can cause the occupant to "slide" forward relative to the seat 14 toward the instrument panel 24. An "un-belted" occupant (not shown in the Figures) has a greater likelihood of experiencing such movement. Further, a person of ordinary skill in the art will appreciate that even a vehicle occupant secured by a seat belt webbing system may move some amount. Thus, there is a potential that the occupant 12 could be moved near or into the occupant OOP zone 66.

During routine vehicle operation (i.e., the vehicle 16 is not currently involved in a pre-crash braking maneuver or other significant deceleration) the position of the occupant 12 does not rapidly change.

The position of the occupant 12 during routine vehicle operation is generally static. Thus, the position of the occupant 12 (i.e., distance between the ultrasound sensor 40 and the occupant) need not be updated at a high frequency of occurrence.

Consider the example of the seat 14 having the seat back located 40 inches from the ultrasound sensor 40. The distance to the occupant would, of course, be less than 40 inches. A sensor rate of one signal output per each six millisecond period would more than allow for the echo from the occupant to return to the ultrasound sensor 40 before a subsequent signal 46 is emitted. Even if the seat 14 is unoccupied, the echo would return from the seat back before the subsequent signal 46 is emitted.

However, during the involuntary forward movement of the occupant caused by the vehicle braking deceleration, a sensor rate of one signal output for each six millisecond period may make precise determinations of current occupant position difficult. This issue would be more pronounced for even greater time intervals between subsequent signal outputs (e.g., a time interval greater than 6 milliseconds) that are sometimes used for vehicles (e.g., trucks or vans) with a large distance between an instrument panel and a seat back.

Accordingly, in the present invention, the sensor rate of the ultrasound sensor 40 is adjustable. Moreover, the sensor rate is based upon a continuously varying functional relationship to the sensed distance between the ultrasound sensor 40 and the occupant 12. This is illustrated via the sequence of FIGS. 3–6.

When the occupant 12 is at a first distance (e.g., distance D1, FIG. 3) the driver 44 is operating the ultrasound sensor 40 at a first rate (e.g., rate 1). When the occupant 12 is at a second distance (e.g., distance D2, FIG. 4), which is different than the first distance (FIG. 3), the driver 44 is operating the ultrasound sensor 40 at a second rate (e.g., rate 2, FIG. 4), which is different than the first rate. Similarly, at a third distance (e.g., D3, FIG. 5), the sensor 40 is operated at a third rate (e.g., rate 3) and at a fourth distance (e.g., D4, FIG. 6), the sensor is operated at a fourth rate (e.g., rate 4). All of the distances (distances D1–D4) are different and all of the rates (rates 1–4) are different. The sensor rate is preferably adjusted so that each "ping" is permitted to return as an echo before a next "ping" is emitted, but undue amounts of additional time after the anticipated return of the echo is eliminated.

Figure 7:
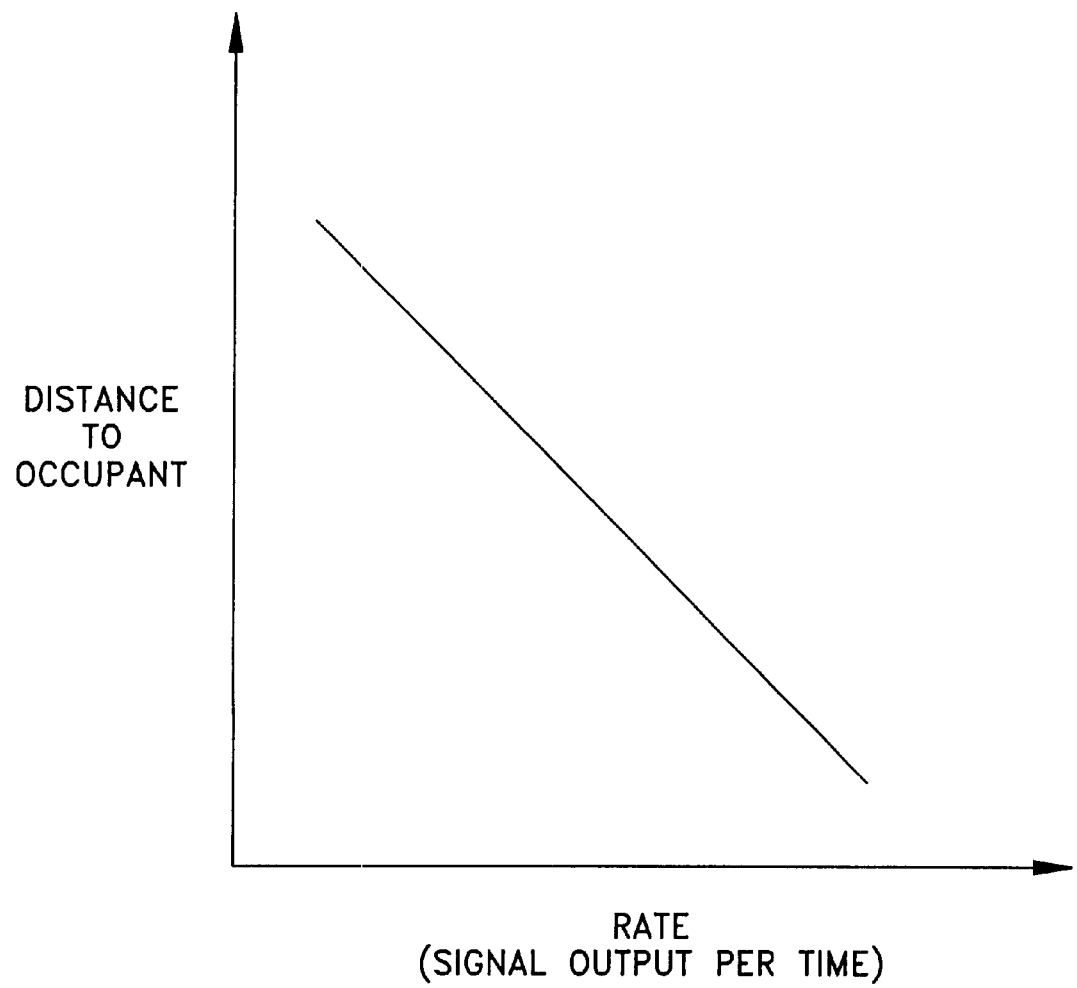
FIG. 7 is a graph illustrating change in a sensor rate for a sensor of the apparatus shown in FIG. 1.

The ultrasound sensor 40 can have a default low setting of the sensor rate. Also, the sensor rate is adjusted by increasing the rate from the default setting in proportion to determined decreases in the distance between the ultrasound sensor 40 and the occupant 12. In other words, as shown in FIG. 7, the sensor rate and the distance have an inverse relationship (e.g., as the distance decreases, the sensor rate increases). Preferably, the relationship between the sensor rate and the distance is a linear inversely proportional relationship. However, the relationship may be non-linear.

Figure 2:
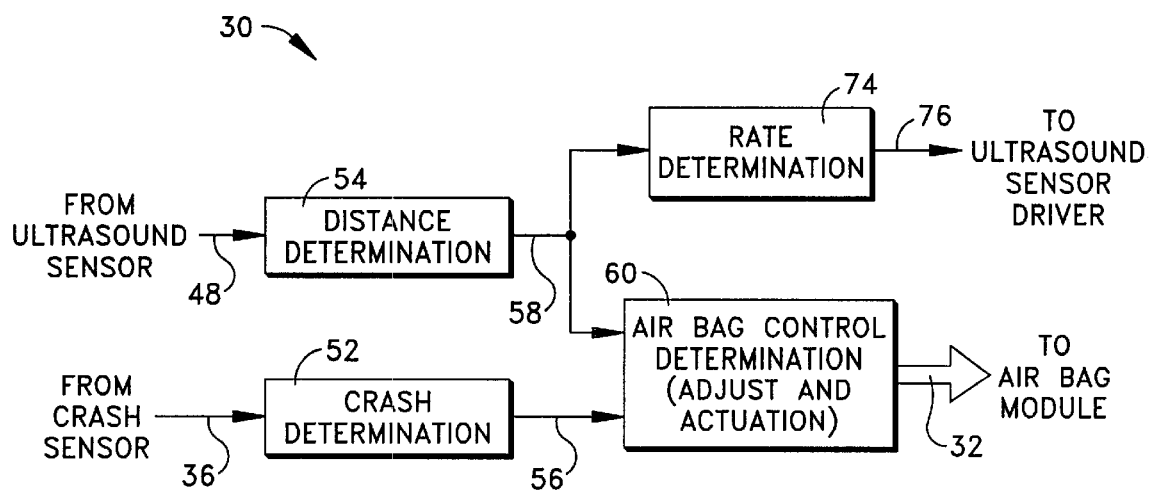
FIG. 2 is a function block diagram of a controller shown in FIG. 1.
Figure 3:
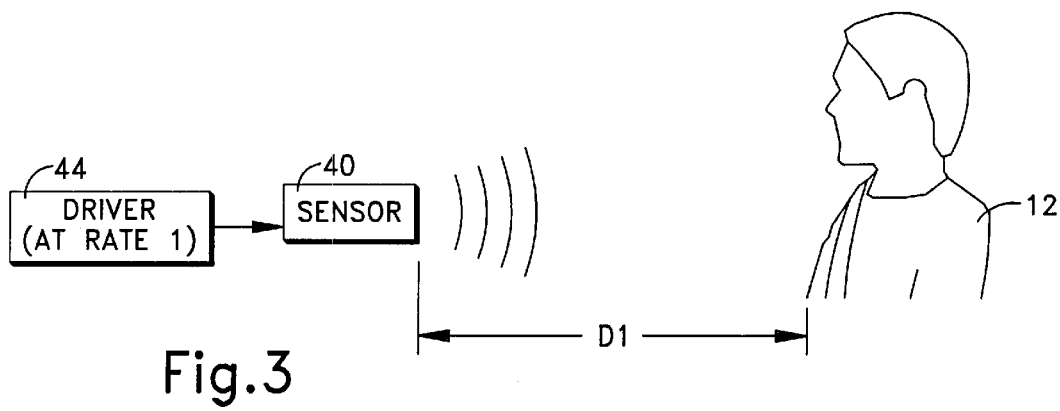
FIGS. 3–6 are each a schematic illustration of a portion of the apparatus during operation of sensing an occupant position, and each shows sensor operation at a different sensor rate for a different associated sensed distance.
Figure 4:
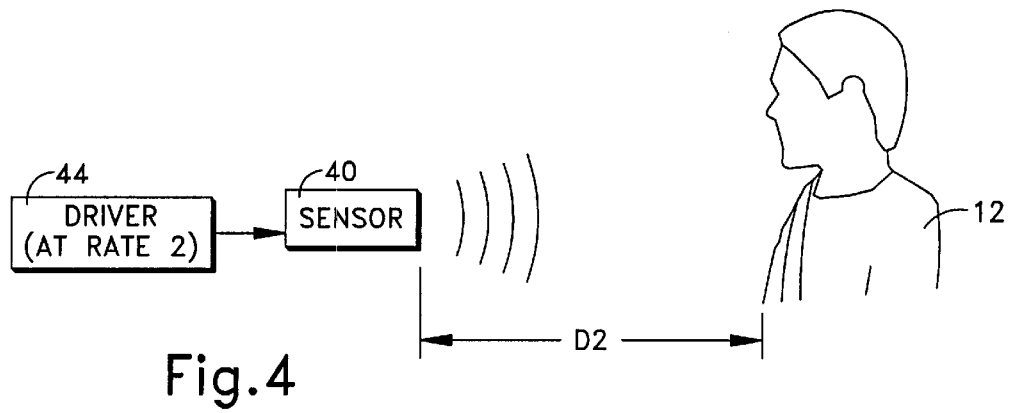
Figure 5:
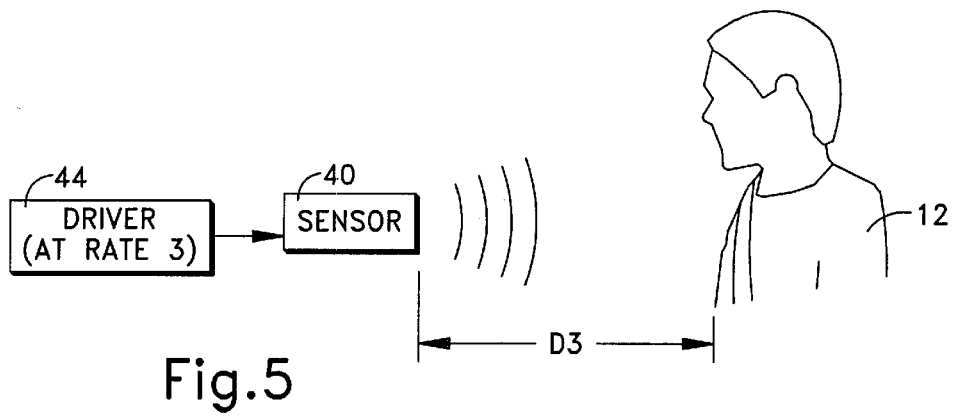
Figure 6:
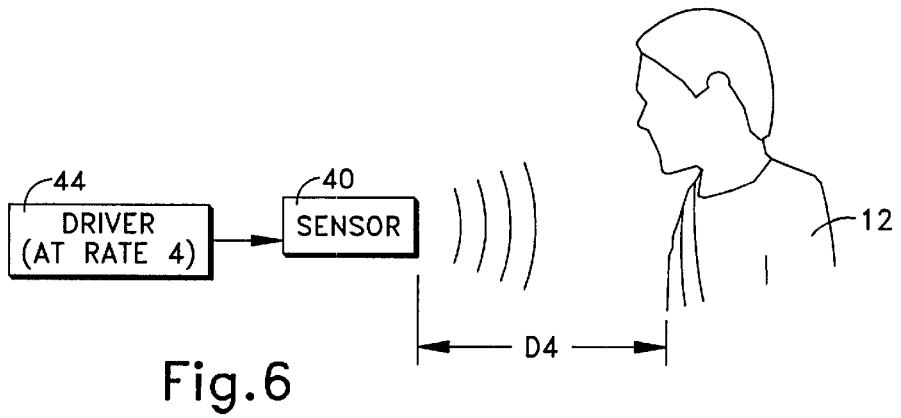

In order to adjust the sense rate, the controller 30 includes a rate determination function 74 (FIG. 2). The output signal 58 from the distance determination function 54 is provided to the rate determination function 74. The distance information in the signal 58 is processed by the rate determination function 74 to determine (e.g., derive) a new sensor rate. The new sensor rate may be derived via calculation using the updated distance value in an algorithm or via retrieval of a stored sensor rate value from a memory (e.g., a look-up table) using the distance value to determine a memory address. An updated sensor rate is provided by the rate determination function 74 to the driver 44 via a signal 76.

Figure 8:
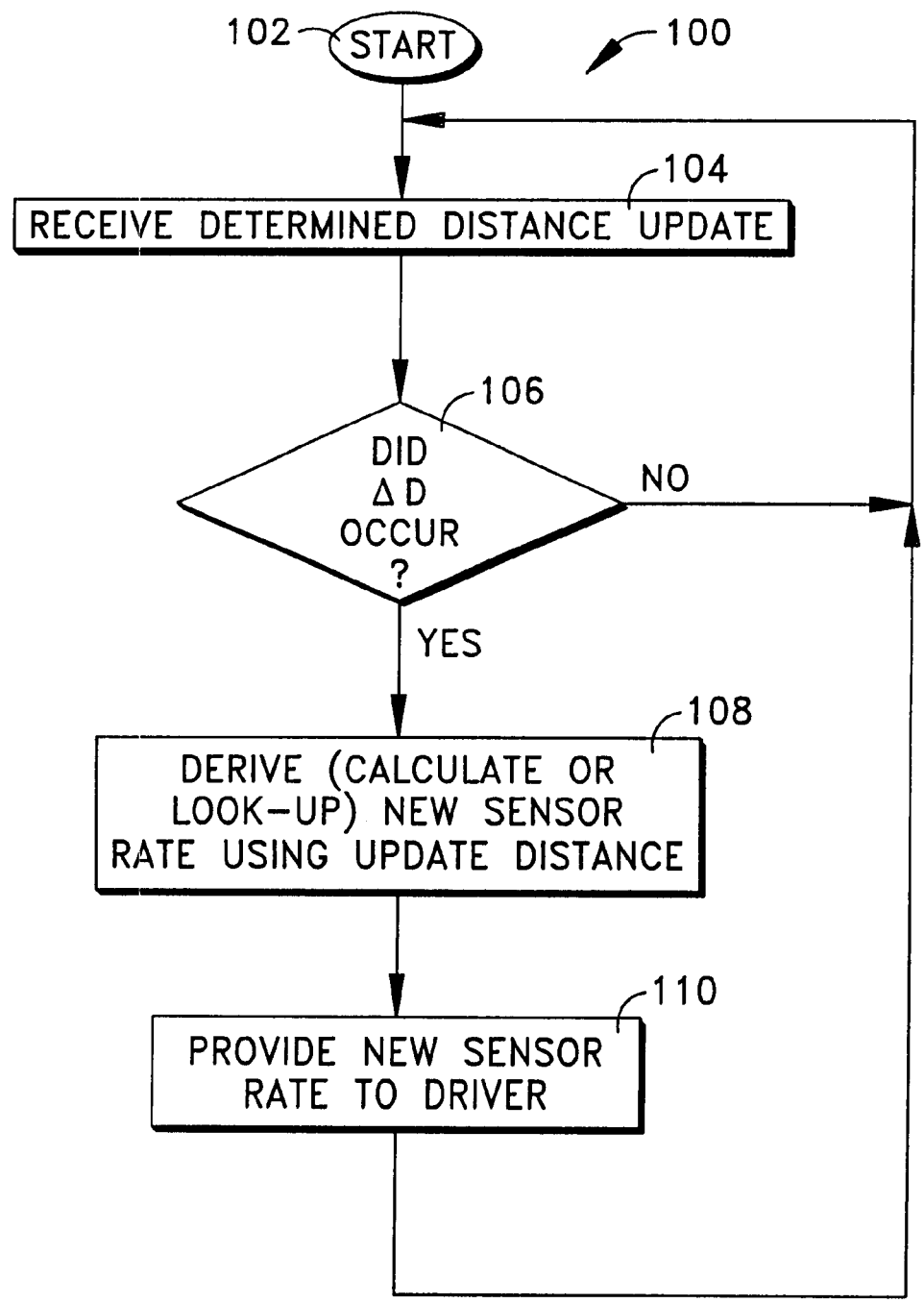
FIG. 8 is a flow chart for a rate determining process performed within the controller of FIG. 2.

A portion of a process 100 performed by the rate determination function 74 of the controller 30, in accordance with the present invention, is shown in FIG. 8. The process 100 is initiated at step 102 and proceeds to step 104. At step 104, the current (i.e., the updated) distance value is received. At step 106, it is determined whether a change (i.e., ΔD) has occurred (i.e., the vehicle occupant has moved since the last distance determination). If the determination at step 106 is negative (e.g., occupant has not moved and the distance has not changed), the process 100 loops back to step 104.

If the determination at step 106 is affirmative (i.e., the occupant has moved and the current distance is now different that the previous distance), the process 100 goes to step 108. At step 108, a new sensor rate (e.g., a new ping rate) is derived using the current (i.e., updated) distance. The derivation of the new sensor rate may be via calculation using the distance value in an algorithm or retrieval of a stored sensor rate value from a memory (e.g., a look-up table) using the distance value to determine a memory address. At step 110, the new sensor rate is provided to the driver 44. The process 100 then loops back to step 104.

Having a low sensor rate lowers the burden or processing overhead on the control system during normal operation (i.e., non-braking, non-deceleration, and the occupant located away from the occupant OOP zone 66). In other words, the system 10 need not work to update the occupant position at a high frequency. Further, sensing at lower rates tends to provide a filtering effect against spurious signals.

Increasing the sensor rate has the effect of providing more recent occupant position information for processing by the air bag control determination function 60. The increase in the amount of information permits a more detailed occupant position and movement analysis. Also, because the processing of information for air bag control determinations may occur within a short time period, it may be beneficial to update the occupant position faster.

It is noted that the distance sensing in the illustrated example is primarily intended to be a measurement to the torso/head/thorax of the occupant. The ultrasonic energy may also be reflected by other body parts (e.g., a waving hand) of the occupant or even other objects (e.g., a portion of the seat 14). Return echo signals from such targets are often referred to herein as spurious signals. It is contemplated that such signals can be disregarded, ignored, or otherwise disposed of, via filtering, averaging, or the like. Although it is contemplated that such processing of spurious signals to avoid incorrect distance measurements can occur within a system that employs the present invention, such processing is not part of the present invention and not discussed in detail herein.

From the above description of the invention, those skilled in the art will perceive improvements, changes and modifications. For example, any or all portions of the functions performed within the controller 30 may be performed by hardwired components or by computing devices using software, or by a combination thereof. Such improvements, changes, and modifications within the skill of the art are intended to be covered by the appended claims.

Having described the invention, the following is claimed:

1. An apparatus for determining distance to an object, said apparatus comprising:

sensor means for sensing distance to the object from the sensor means at a sensor rate; and variation means for continuously varying the sensor rate of the sensor means, the sensor rate being dependent only upon the sensed distance and varying inversely to the sensed distance.

2. An apparatus as set forth in claim 1, wherein said variation means includes means for varying the sensor rate as a linear function of the sensed distance.

3. An apparatus as set forth in claim 1, wherein said sensor means includes an ultrasound sensor, said sensor rate is a rate at which the ultrasound sensor outputs ultrasonic pings.

4. An apparatus as set forth in claim 1, wherein said apparatus is part of a vehicle occupant protection system that has an actuatable occupant protection device, said sensor means including means for sensing a distance to an occupant, said apparatus including means for outputting a signal indicative of the sensed distance to a portion of said protection system that utilizes the sensed distance to control said occupant protection device.

5. An apparatus as set forth in claim 4, wherein said occupant protection system device includes an air bag module.

6. An apparatus for determining distance to an object, said apparatus comprising:

means for emitting signals at a rate toward the object, the object reflecting the signals;

means for receiving reflected signals from the object;

means for determining a time between emission of a signal and reception of an associated reflected signal;

means for determining a distance to the object using the determined time; and means for changing the rate of signal emission in response to each change in determined distance, the rate of signal emission changing dependent upon only the determined distance.

7. An apparatus as set forth in claim 6, wherein said means for changing the rate includes means for changing the rate such that a reflected signal from the object received at said means for receiving occurs prior to said means for emitting a subsequent signal.

8. An apparatus as set forth in claim 6, wherein said means for changing the rate includes means for changing the rate in an inverse proportion to the determined distance.

9. An apparatus as set forth in claim 6, wherein said means for changing the rate includes means for changing the rate as a linear function of the determined distance.

10. An apparatus as set forth in claim 6, wherein said apparatus is part of a vehicle occupant protection system that has an actuatable occupant protection device, the determined distance is a distance to an occupant, said apparatus including means for outputting a signal indicative of the determined distance to a portion of said protection system that utilizes the determined distance to control said occupant protection device.

11. An apparatus as set forth in claim 10, wherein said occupant protection system device includes an air bag module.

12. A method for determining distance to an object, said method comprising:

sensing distance to the object at a sensor rate; and varying the sensor rate as a function of only the sensed distance, the sensor rate varying inversely to the sensed distance.

13. A method as set forth in claim 12, wherein said step of sensing includes emitting signals at the sensor rate toward the object, receiving reflected signals from the object, and determining a time between emission of a signal and reception of an associated reflected signal, and said step of varying includes changing the sensor rate in response to each change in determined distance.

14. A method as set forth in claim 13, including providing a signal indicative of the determined distance for control of an occupant protection device.

15. A method for controlling an occupant protection device in an occupant protection system for a vehicle, said method comprising:

sensing a distance to a vehicle occupant at a sensor rate;

making determinations regarding control of the protection device using the sensed distance; and varying the sensor rate inversely to only the sensed distance.

16. An apparatus for determining distance to an object, comprising:

sensor means for emitting signals at a sensor rate toward the object, the object reflecting the signals;

means for receiving reflected signals from the object;

means for determining a time between emission of a signal and reception of an associated reflected signal;

means for determining a distance to the object using the determined time;

means for determining the sensor rate in response to each change in the determined distance; and means for changing the rate of signal emission in response to the sensor rate determination.

17. An apparatus as set forth in claim 16 wherein said means for determining the sensor rate in response to each change in the determined distance includes means for determining the sensor rate as a function of the determined distance.

18. An apparatus as set forth in claim 16 wherein said means for determining the sensor rate in response to each change in the determined distance includes:

means for calculating the sensor rate with an algorithm using a value that corresponds to the determined distance.

19. An apparatus as set forth in claim 16 wherein said means for determining the sensor rate in response to each change in the determined distance includes:

means for using a value that corresponds to the determined distance to determine a memory address in a memory;

means for retrieving a stored sensor rate value from the memory; and means for setting the sensor rate in response to the sensor rate value.

* * * * *